Dec. 27, 1927.

E. M. BALLOT 1,654,447

SUSPENSION FOR VEHICLES

Filed Jan. 5, 1925

INVENTOR.
E. M. Ballot
By William C. Linton
Atty.

Patented Dec. 27, 1927.

1,654,447

UNITED STATES PATENT OFFICE.

ERNEST MAURICE BALLOT, OF PARIS, FRANCE.

SUSPENSION FOR VEHICLES.

Application filed January 5, 1925, Serial No. 645, and in France January 12, 1924.

The present invention relates to an improved suspension for vehicles whereby the vehicle frame will be more suitably maintained during the travel.

The vehicle frame is herein connected with the axles through the medium of groups of two combined springs which are suitably mounted and occupy the lengthwise or the transverse position with respect to the centre line of the vehicle and act in parallel planes.

In each group, the corresponding load may be distributed so that one half the load is brought upon each spring, or the entire load is supported by one of the springs whilst the other serves as a shock absorber, i. e. to brake the oscillations of the suspended mass when the latter exceeds the position of equilibrium.

The appended drawings which are given by way of example show various embodiments of the said invention as applied to motor vehicles.

Figure 1:
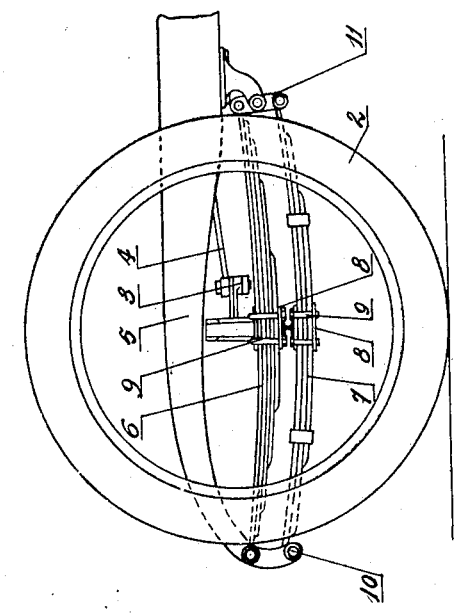
Fig. 1 is an end view of a front axle comprising two combined longitudinal springs.

As shown Fig. 1, 1 represents the front axle having at the ends the steering wheels 2, these latter being connected together in the known manner by the coupling bar 3 and with the steering control by the rod 4. The vehicle frame 5 rests upon the axle 1 through the medium of groups of springs 6, 7 one of which is mounted above and the other below the said axle by means of straps 8 and bolts 9.

At the front part, the said springs are simply mounted upon the pivots 10 which are secured to the vehicle frame.

In each group, one of the said springs may serve as a support and the other as a shock absorber, and in this event the first spring will alone support the static load; the second spring when subjected to this load will have its deflection—due to its construction—so disposed as to assume the inoperative position.

The operation is as follows:

The front branches of the main plates will draw forward the vehicle axle and will balance the braking efforts when the front brakes are thrown on. The supporting springs are alone operative only when the vehicle is stationary. The shock absorbing springs will only act when the position of equilibrium of the vehicle frame is departed from, and they will brake the oscillations of the frame.

Figure 2:
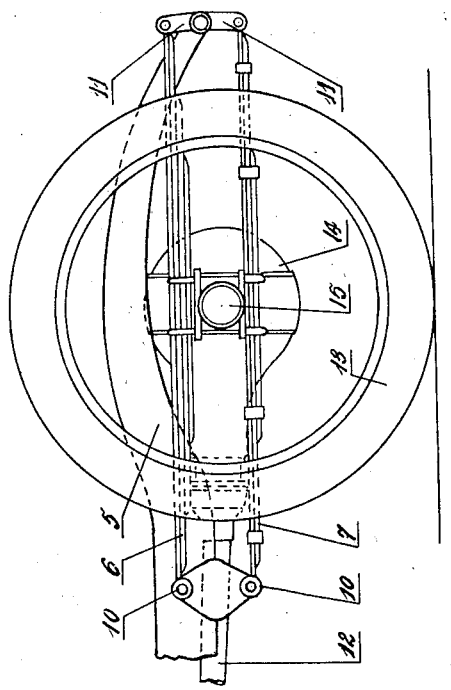
Fig. 2 is an elevational view of a rear axle which is also provided with combined longitudinal springs.

Fig. 2 shows like parts mounted upon the rear driving axle of the vehicle.

The power transmission shaft 12 is so disposed as to impart its motion to the wheels 13 through the medium of the differential 14 and the axle 15. At each end of the latter is mounted a group of springs 6 and 7 upon which the vehicle frame 5 is caused to bear by means of the pivots 10 at the front part and the shackles 11 at the rear; as in the preceding arrangement, these latter will provide for the elongation of the springs, whilst the pivots 10 serve to transmit the driving and braking stresses.

Figure 4:
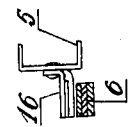
Fig. 4 is a section on the line IV—IV of Fig. 3.
Figure 3:
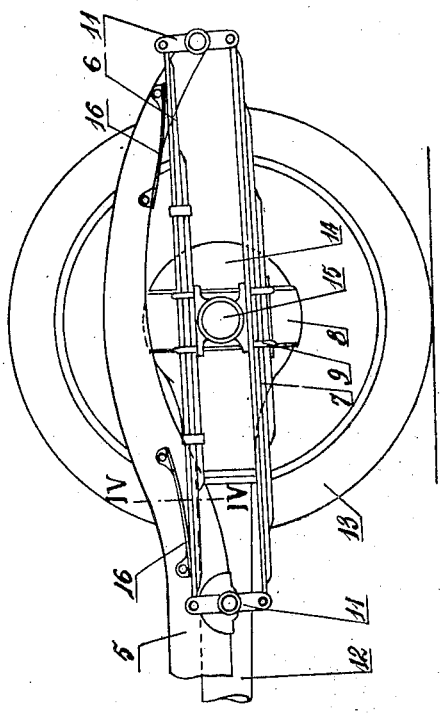
Fig. 3 shows a modification of the suspension represented in Fig. 2.

In the arrangement shown in Figs. 3 and 4, the springs 6 and 7 are provided at each end with the shackles 11 or with like means connecting them with the vehicle frame. The spring 7 herein disposed below the axle 15 serves as the supporting spring, whilst the spring 6 serves as the shock absorber.

Two curved angle pieces 16 which are bolted to the corresponding longitudinal of the frame are also disposed above the said shock absorber so as to serve as abutments therefor in the event of a static or a dynamic overload. The curvature of the said angle pieces is such that the length of the branches of the spring will be progressively reduced, whereby the flexibility of the whole suspension system will be diminished. Owing to the addition of these surfaces, springs can be designed whose strength increases with the load, which is a necessary condition for an approved suspension.

Obviously, the devices hereinbefore described are susceptible of various modifications in detail without departing from the principle of the invention.

I claim:

A suspension for vehicles comprising in combination a suspension spring having its medial portion connected to the axle of the vehicle, means for connecting the ends of the spring to the chassis, a shock absorbing spring arranged vertically above the suspension spring and having its medial portion fixed relatively to the medial portion of the suspension spring, independent means for connecting the ends of the shock absorbing spring to the chassis so as to be unaffected when the vehicle is at a stand still and normally loaded and fixed abutments on the chassis cooperating with the shock absorbing spring to normallly effect variation of its flexibility during driving and in the event of disability of the suspension spring, to effectively suspend the chassis.

In witness whereof I have hereunto set my hand.

ERNEST MAURICE BALLOT.